July 8, 1952 C. H. HUTSELL 2,602,354
SAW SHARPENING DEVICE EMPLOYING A GRINDING WHEEL
Filed Oct. 4, 1950 4 Sheets-Sheet 1
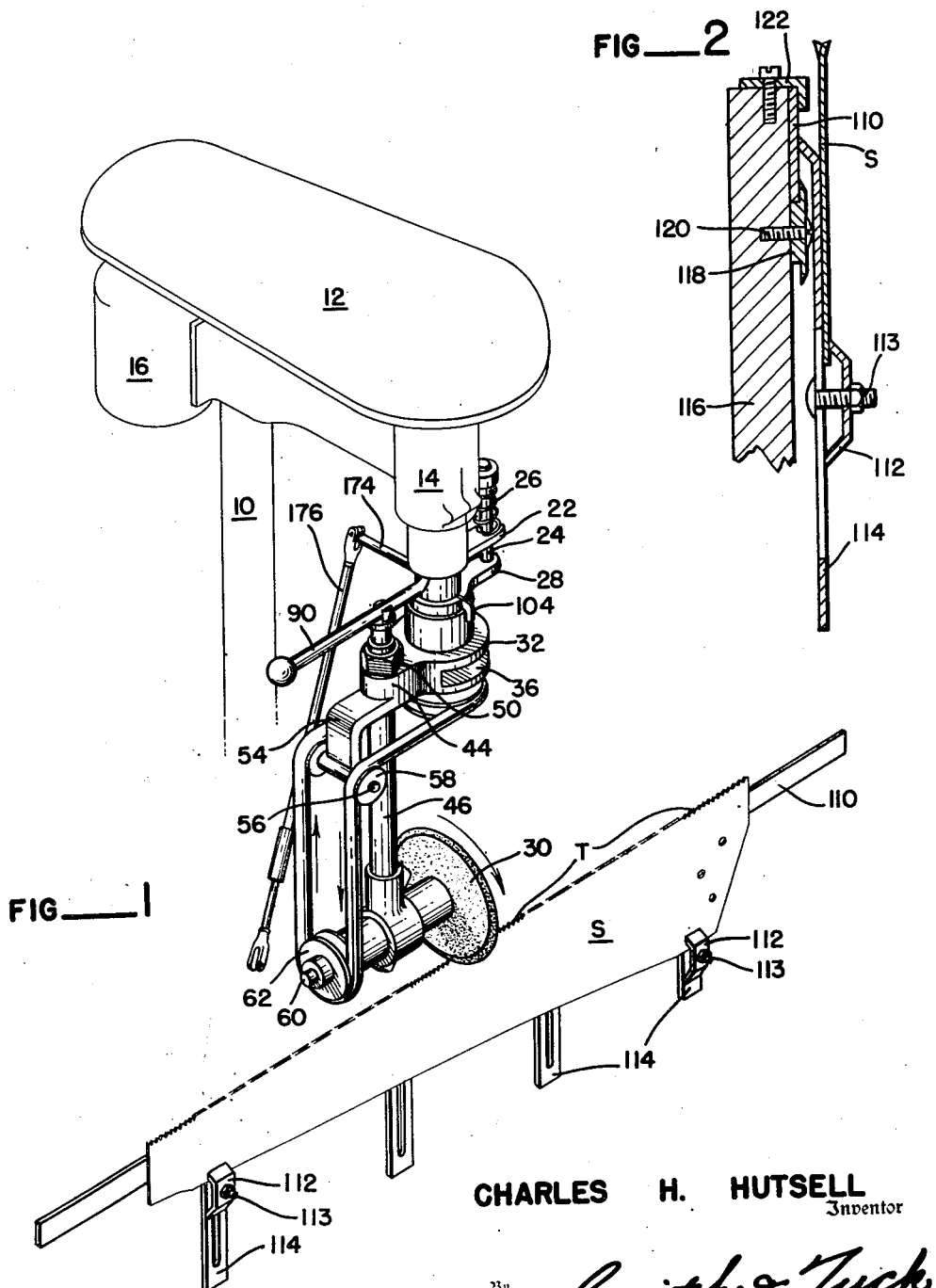
CHARLES H. HUTSELL
Inventor
By Smith & Tuck
Attorneys July 8, 1952 C. H. HUTSELL 2,602,354
SAW SHARPENING DEVICE EMPLOYING A GRINDING WHEEL
Filed Oct. 4, 1950 4 Sheets-Sheet 2

CHARLES H. HUTSELL
Inventor

By Smith & Tuck
Attorneys

July 8, 1952 C. H. HUTSELL 2,602,354
SAW SHARPENING DEVICE EMPLOYING A GRINDING WHEEL
Filed Oct. 4, 1950 4 Sheets-Sheet 4
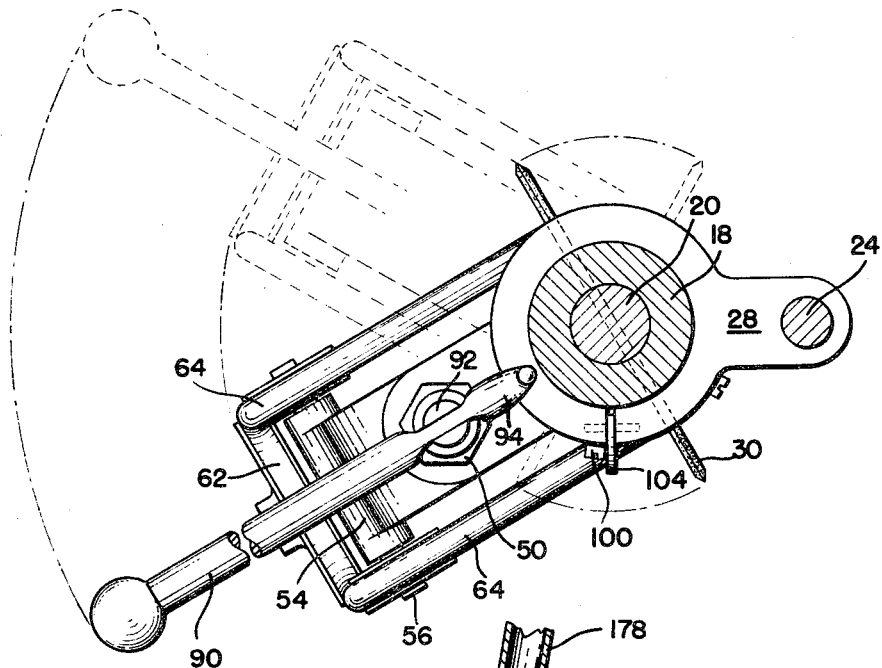
FIG. 5
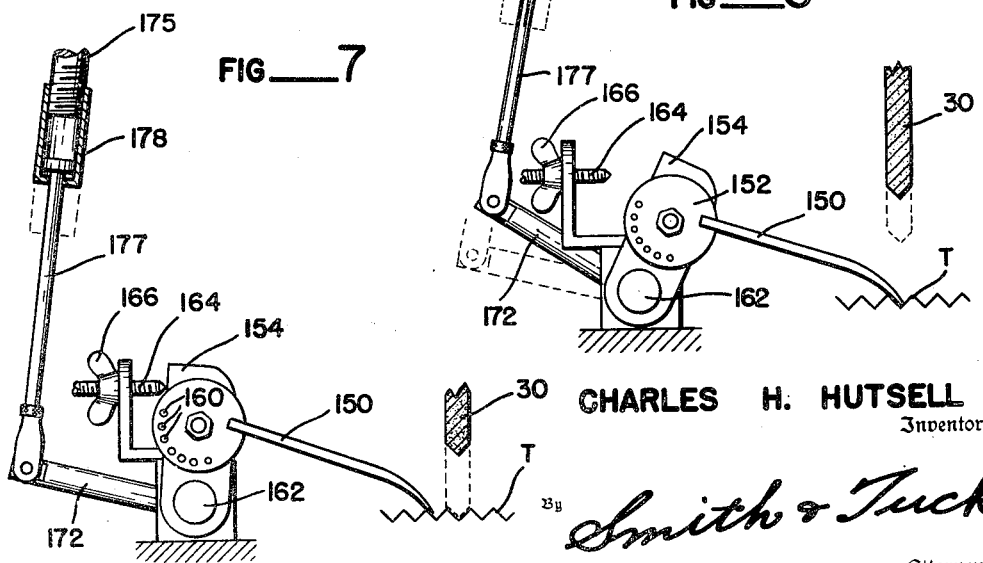
FIG. 6
FIG. 7
CHARLES H. HUTSELL
Inventor
By Smith & Tuck
Attorneys Patented July 8, 1952

2,602,354

UNITED STATES PATENT OFFICE 2,602,354

SAW SHARPENING DEVICE EMPLOYING A GRINDING WHEEL

Charles H. Hutsell, Seattle, Wash.

Application October 4, 1950, Serial No. 188,381

4 Claims. (Cl. 76—41)

My invention relates to devices for sharpening saws; and, more particularly, to a saw sharpening device employing a grinding wheel. My saw sharpening device is adapted to be incorporated with the structure of drill presses of common manufacture, although the entire assembly could be manufactured and especially adapted just for saw sharpening. Briefly, the principal components of my saw sharpening device are as follows: Supporting means is provided for a saw permitting sliding movement of the saw in an end forward direction past a sharpening station. A grinding wheel is positioned over the sharpening station with its axis of rotation disposed horizontally. Supporting means for the grinding wheel is provided permitting movement of the grinding wheel vertically but normally biasing the grinding wheel to an upper position. The supporting means for the grinding wheel also includes means permitting rotation of the grinding wheel about a vertical axis passing through the center of the grinding wheel. Adjustable means is provided for advancing the saw the distance between teeth upon movement of the grinding wheel downward and upward.

Saw sharpening is generally considered a task for the skilled artisan, who, with much the same tools as used for many years, manually files the saw using his best judgment as to uniformity of the operation. This is a tedious and expensive operation and is in contrast to developments in most fields where such skilled work is replaced by time saving, more efficient mechanical devices. Experience has shown that saws sharpened by my saw sharpening device are the equal of saws sharpened by the best of the artisans skilled in this field. Needless to say, many saws are very poorly cut by some sharpeners. Only moderate skill is needed to produce good results with the present device, and production is increased many fold.

The objects of my invention include: providing mechanical means for sharpening saws; utilizing a grinding wheel for such work; furnishing a saw sharpening device which may be incorporated with standard drill presses; providing means for sharpening saws with power equipment; increasing the production of workers in the field; providing a saw sharpener which may be operated by the average skilled mechanic which will quickly and accurately perform its function; and devising means of advancing a saw past a sharpening station by intermittent movement, each movement being equal to the distance between teeth.

My invention will be best understood from the following description when read with reference to the accompanying drawings, in which:

Figure 1 is a perspective view of a specific embodiment of the supporting and operating means for the grinding wheel as combined with a standard drill press shown in fragmentary form, with a saw and clamping means for the same shown below the grinding wheel;

Figure 2 is an enlarged end view, partly in section and in fragmentary form, of the means for clamping a saw and supporting the same for movement in an end forward direction;

Figure 5 is a cross-sectional view taken on line 5—5 of Figure 3, with a view in dotted lines in which the operating lever is at the other end of its path of travel;

Figure 6 is a schematic view of the pusher arm assembly in its extended position; and Figure 7 is a schematic view of the pusher arm assembly in its retracted position.

*Grinding wheel assembly*

Figure 3:
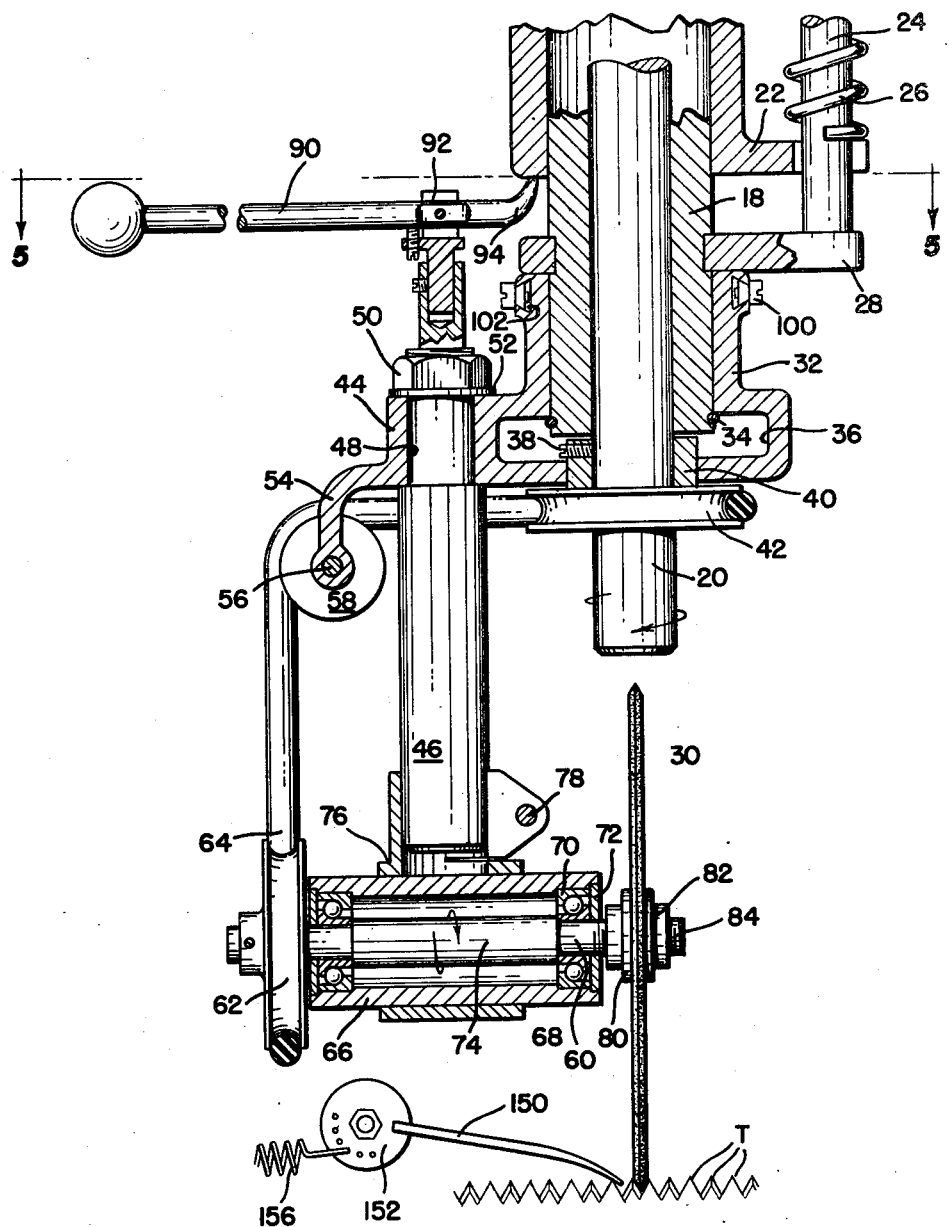
Figure 3 is an enlarged front view, partly in section and in fragmentary form, of the grinding wheel assembly, with the grinding wheel in contact with the teeth of a saw.
Figure 4:
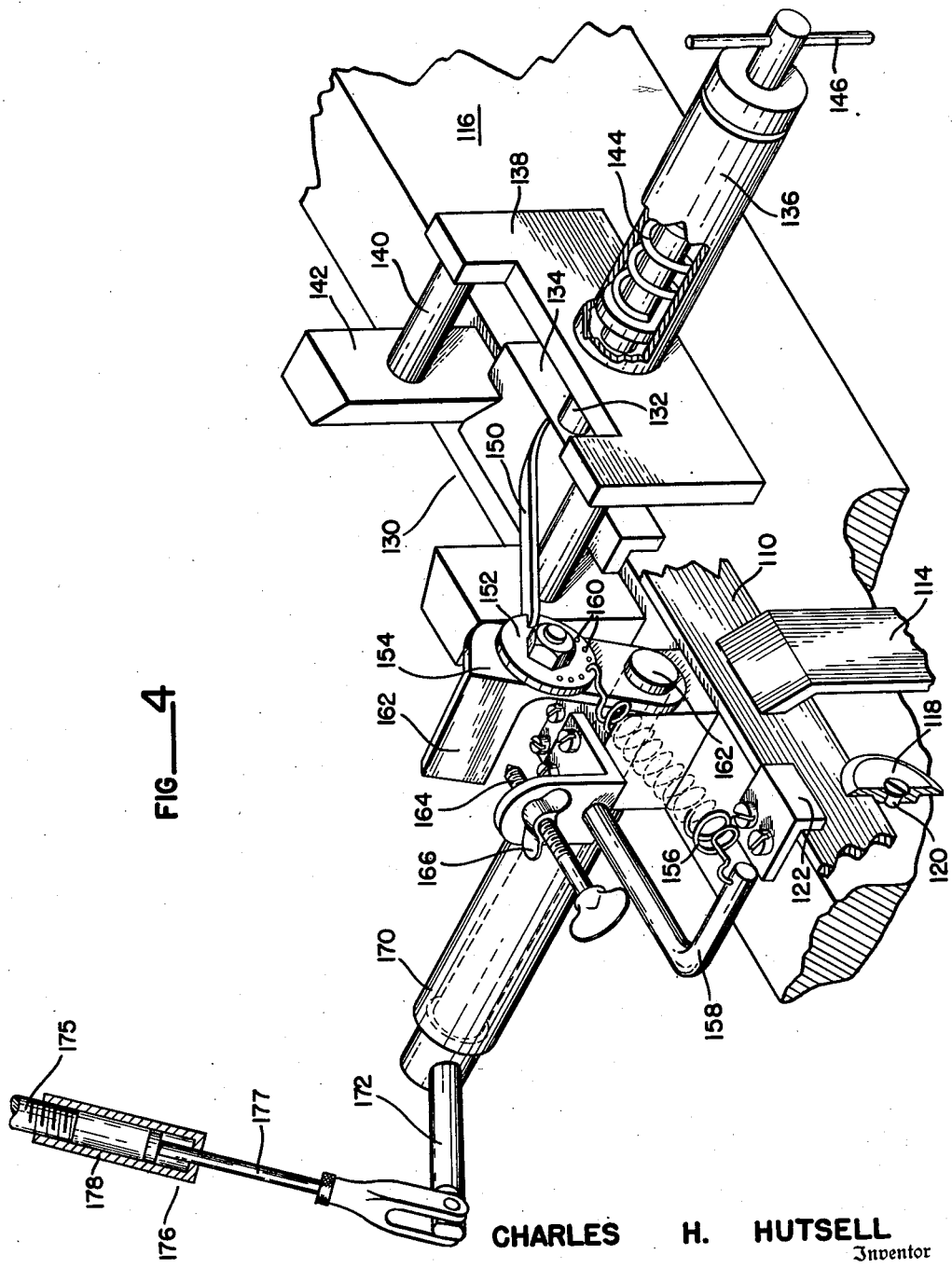
Figure 4 is an enlarged perspective view, partly in section and in fragmentary form showing the means for positioning the saw and for advancing the same past the sharpening station.

In Figure 1, portions of a standard drill press are shown, with pedestal 10, bracket member 12, main shaft housing 14 and electric motor 16. Although a complete saw sharpening assembly could be manufactured, expense is considerably reduced by incorporating the saw sharpening device in such a drill press.

Standard parts of drill presses also include a fixed housing 17, a slidable sleeve 18 therein, vertical shaft 20, and arm 22 on main shaft housing 14 having an opening in which rod 24 is positioned. Rod 24 is biased upward by spring 26 and has its lower end secured to annular member 28 which fits into an annular groove in slidable sleeve 18. Vertical shaft 20 furnishes power to grinding wheel 30. Sleeve 18 being slidable and being normally biased upward by spring 24, grinding wheel 30 may be lowered to contact the teeth T of saw S but tends to assume an upper position.

Collar 32, having an opening in which slidable sleeve 18 is positioned, is secured by means of a resilient ring 34. Side openings 36 in collar 32 provide access to ring 34 as well as set screw 38 in sheave bearing 40. Sheave bearing 40 is set in a lower opening in collar 32 and supports sheave 42 below collar 32 on vertical shaft 20.

Collar 32 has a boss portion 44 extending to the side. Vertical connecting member 46 has a reduced upper portion positioned in opening 48 in boss portion 44. Nut 50 secures connecting member 46 to boss portion 44, there being a washer 52 interposed between nut 50 and boss portion 44. Boss portion 44 terminates in a downwardly extending arm 54, carrying rod 56 on which are mounted a pair of sheaves 58. Horizontal grinding wheel shaft 60 carries sheave 62 on one end. Flexible connector 64 runs over sheaves 42, 58 and 62, to transmit power from vertical shaft 20 to horizontal shaft 60. Other means of transmitting power could be devised but the present system has proved to be quite efficient.

Horizontal shaft 60 is journaled in bearing housing 66 and is rotatably supported by ball bearings in inner and outer races 68 and 70 respectively. End plates 72 seal bearing housing 66. Horizontal shaft 60 has an enlarged central portion 74 with the ends thereof abutting on inner races 68. Clamping member 76 has a horizontal passageway in which bearing member 66 is positioned and a vertical passageway in which the lower end of connecting member 46 is secured as by screw 78.

Two annular clamp members, as 80, 82, having internal threads, are positioned at either side of grinding wheel 30, on a threaded end portion 84 of horizontal shaft 60. These clamp members act in the manner of double nuts and do not move longitudinally of the shaft. Outer clamp member 82 is removed to exchange grinding wheels.

Operating lever 90 is pivoted to a fulcrum member 92 secured to connecting member 46. One end of operating lever is knobbed and the other end has a hook 94. As the knobbed end is depressed, hook 94 coacts with the underside of main shaft housing 14 to depress grinding wheel 30. Adjustable stop means, as 96, limits the pivotal movement of operating lever 90. Fulcrum member 92 is secured against movement about a vertical axis by set screw 98 which permits adjustment of the vertical position of fulcrum member 92.

Referring to Figure 5, grinding wheel 30, being centered under vertical shaft 20, is pivoted about its center an equal number of degrees to that of operating lever 90. Thus grinding wheel 30 may be presented to the saw teeth at various pre-determined angles according to how far operating lever 90 is swung before it is depressed. Adjustable stops 100 are provided, set in annular groove 102 in collar 32; and stop member 104 is secured to annular member 28. In grinding, operating lever 90 is swung until stop member 104 abuts one stop 100, is then depressed sharpening the saw teeth T immediately below, as is shown in Figure 3. Then operating lever 90 is released, whereupon grinding wheel 30 ascends under the urgence of spring 26. Operating lever is swung until stop member 104 abuts the second stop 100 and is again depressed. In the meanwhile, saw teeth T have been advanced a distance equal to the distance between teeth, by mechanism to be described later, and the next saw tooth is ground with an opposite bevel. This operation may be quite rapid, so uniform, accurate, opposite bevels are sharpened. The common practice before was to make the bevels by manual use of a file, a tedious process often leaving something to be desired in accuracy. Adjustments for different types and sizes of saws and saw teeth may be quickly made by the various adjustable members described.

*Means for advancing saw past grinding station*

Saw S is secured to guide rail 110 by means of adjustable clamps 112 secured as by bolts and nuts 113 to slotted lateral members 114. Supporting member 116 may be formed as a part of the drill press table or may be attached to the table. Guide rail 110 is disposed for movement along supporting member 116 by means of rollers 118 rotatably positioned along supporting member 116 as by screws 120. Flanges 122 guide the upper portion of guide rail 110. Saw S is guided against lateral movement at the grinding station, generally indicated by number 130, by means of guide rod 132 which normally biases saw S against guide member 134. Guide rod 132 is slidably disposed in cylinder 136 secured to plate 138. Plate 138 is secured to supporting member 116 by means of rods 140 extending above the path of travel of saw teeth T and secured to upstanding members 142 on supporting member 116. Guide rod 132 is pressed inward by spring 144 in cylinder 136, and pin 146 running through the end of guide rod 132 provides means of retracting guide rod 132 while saw S is being initially positioned.

Saw S is intermittently advanced by means of pusher arm 150 and associated mechanism. Pusher arm 150 is secured to disc 152 which is rotatably mounted on operating member 154. Disc 152 biases pusher arm 150 downward by means of spring 156 secured to disc 152 and a supporting rod 158, there being a plurality of openings 160 in disc 152 providing means of adjusting the pressure exerted on pusher arm 150. Operating member 154 is secured to operating rod 162 rotatably mounted on supporting member 116. Adjustable means for limiting retraction of pusher arm 150 by operating member 154 includes stop flange 162 on operating member 154 and adjustable stop screw 164. Screw 164 is secured by means of winged nut 166.

Operating rod 162 is positioned in cylindrical bearing member 170. Crank 172 is secured to the end of operating rod 162 opposite operating member 154. Lateral rod 174, secured to annular member 28, is connected to crank 172 by means of link 176 pivotally secured to each member. Link 176 has two portions, as 175 and 177, secured together by a turnbuckle. One end of turnbuckle sleeve 178 is internally threaded and link portion 175 is likewise threaded furnishing means for adjusting the length of link 176. The other end of 178 has an opening in which an enlarged end of link portion 177 is positioned.

Referring especially to Figures 6 and 7, the length of link 176 is adjusted by the turnbuckle so that pusher arm 150 will advance the teeth of the saw to the position shown in Figure 6 on each upward movement of grinding wheel 30. As grinding wheel 30 moves downward, as shown in Figure 7, pusher arm 150 is retracted the distance between teeth. Screw 164 forms a limit to the retraction of pusher arm 150, screw 164 being adjusted for different spacing of teeth. Pusher arm 150 is in its rear position before grinding wheel 30 contacts teeth T. Further collapsing of link 176 is absorbed by lost motion of link portion 177 within turnbuckle sleeve 178. Likewise, on movement of grinding wheel 30 upward, pusher arm 150 maintains its position until grinding wheel 30 has cleared teeth T, by means of this lost motion connection.

The described means for advancing a saw past a grinding station by intermittent movement, each movement being equal to the distance between teeth, may find use in various modified structures for sharpening saws. The structure is easily adjustable for various types of saws and is quite efficient.

Having described a specific embodiment of my invention, I do not mean to be limited to the exact structure depicted, but wish to claim all modifications fairly within the scope of my invention.

I claim:

1. An attachment for a machine of the character of a drill press or the like having a fixed housing enclosing a vertically slidable sleeve and a rotatable vertical shaft journaled in said sleeve and including spring means biasing said sleeve and shaft to a normal upper position, said mechanism, comprising: a collar rotatably mounted on and vertically carried by said slidable sleeve; a vertical connecting member having its upper end connected to said collar and depending juxtaposed to and spaced from the axis of rotation of said rotatable vertical shaft; a bearing member secured to the lower end of said connecting member and a shaft horizontally journaled therein; a circular rotary cutting body positioned on one end of said horizontal shaft and centered under said vertical shaft; flexible connector and sheave means for transmitting power from said vertical shaft to said horizontal shaft; and a manually operable lever swingably connected to said collar and rotatably fulcrumed on said fixed housing for depressing said collar and sleeve and for swinging the same about the axis of said vertical shaft.

2. A saw sharpening machine, comprising: a fixed housing enclosing and supporting a vertically slidable sleeve, a shaft rotatably mounted in said sleeve for vertical movement therewith, spring means normally biasing said sleeve upwardly in said fixed housing, a collar rotatably mounted on and carried by said slidable sleeve and having an upright supporting member connected to and depending therefrom laterally juxtaposed to the axis of said vertical shaft, a bearing member supported at the lower end of said connecting member and a shaft horizontally journaled therein, a circular rotary cutting body positioned on one end of said horizontally journaled shaft and centered under said vertical shaft, means for transmitting power from said vertical shaft to said horizontal shaft, and a manually operable lever rotatably fulcrumed on said fixed housing and, intermediate its ends, associated with said collar for depressing and swinging the same about the axis of said vertical shaft.

3. The combination of claim 2 in which the fixed housing has a lower annular surface surrounding the slidable sleeve and the operating lever has a horn to contact said surface and moves thereover during rotation of the collar.

4. The combination of claim 2 in which there is means for movably supporting a saw blade with its teeth upright directly beneath the axis of said rotatable shaft and the low point of said rotary cutting body, and means including an operating link is provided for step by step advancement of the saw blade beneath said shaft axis, said operating link being connected with said vertically slidable sleeve whereby the operating link is activated upon each movement of the sleeve and the step by step advancement means is caused to function.

CHARLES H. HUTSELL.

REFERENCES CITED

The following references are of record in the file of this patent:

UNITED STATES PATENTS

| Number | Name | Date |
|---|---|---|
| 574,855 | Schofield | Jan. 5, 1897 |
| 867,723 | Hedstrom | Oct. 8, 1907 |
| 1,385,339 | Stanzel | July 19, 1921 |
| 1,480,172 | Majewicz | Jan. 8, 1924 |
| 1,846,331 | Hickey | Feb. 23, 1932 |
| 1,970,864 | Nosan | Aug. 21, 1934 |
| 2,343,171 | Collier | Feb. 29, 1944 |
| 2,356,448 | Daggett | Aug. 22, 1944 |
| 2,464,660 | McWhite | Mar. 15, 1949 |
| 2,477,880 | Kershaw et al. | Aug. 2, 1949 |
| 2,519,735 | Boutin | Aug. 22, 1950 |
| 2,555,048 | Long | May 29, 1951 |